(12) United States Patent
Tirkkonen-Rajasalo et al.

(10) Patent No.: US 11,504,878 B2
(45) Date of Patent: Nov. 22, 2022

(54) MATERIALS FOR PACKAGING

(71) Applicant: Sulapac Oy, Helsinki (FI)

(72) Inventors: Laura Tirkkonen-Rajasalo, Helsinki (FI); Suvi Haimi, Helsinki (FI)

(73) Assignee: SULAPAC OY, Helsinki (FI)

( * ) Notice: Subject to any disclaimer, the term of this patent is extended or adjusted under 35 U.S.C. 154(b) by 410 days.

(21) Appl. No.: 16/490,606

(22) PCT Filed: Mar. 2, 2018

(86) PCT No.: PCT/FI2018/050155
§ 371 (c)(1),
(2) Date: Sep. 3, 2019

(87) PCT Pub. No.: WO2018/158506
PCT Pub. Date: Sep. 7, 2018

(65) Prior Publication Data
US 2020/0001497 A1  Jan. 2, 2020

(30) Foreign Application Priority Data

Mar. 2, 2017  (FI) ...................... 20175194

(51) Int. Cl.
C08L 97/02 (2006.01)
B27N 3/00 (2006.01)
B27N 3/02 (2006.01)
B27N 5/02 (2006.01)
B27N 7/00 (2006.01)
C08L 67/02 (2006.01)
C08K 7/00 (2006.01)
C08L 67/04 (2006.01)

(52) U.S. Cl.
CPC ............... B27N 3/002 (2013.01); B27N 3/02 (2013.01); B27N 5/02 (2013.01); B27N 7/005 (2013.01); C08L 67/02 (2013.01); C08L 97/02 (2013.01); C08K 7/00 (2013.01); C08L 67/04 (2013.01)

(58) Field of Classification Search
CPC .......... C08L 67/02; C08L 97/02; C08L 67/04; C08L 101/16; C08K 7/00; C08K 2201/005; C08K 3/013; C08K 11/00; B27N 3/002; B27N 3/02; B27N 5/02; B27N 7/005; B65D 1/00; B29C 45/0001; B29C 45/7207; B29D 22/003; C08J 5/12; C08J 7/04
USPC ......................................................... 524/13
See application file for complete search history.

(56) References Cited

U.S. PATENT DOCUMENTS

| | | | |
|---|---|---|---|
| 8,722,773 B2 | 5/2014 | Hamilton et al. | |
| 2002/0130439 A1 | 9/2002 | Kroner et al. | |
| 2003/0064238 A1* | 4/2003 | Hasegawa | B27N 3/002 428/105 |
| 2005/0025989 A1 | 2/2005 | Brandenburg | |
| 2006/0091578 A1 | 5/2006 | Bravo et al. | |
| 2007/0148384 A1 | 6/2007 | Bowden et al. | |
| 2007/0218219 A1* | 9/2007 | Brandenburg | C08L 97/02 428/17 |
| 2011/0274908 A1 | 11/2011 | Kowata et al. | |
| 2012/0071590 A1* | 3/2012 | Parssinen | A61L 15/125 524/13 |
| 2012/0090759 A1* | 4/2012 | Parssinen | A61L 15/125 264/109 |
| 2012/0231256 A1* | 9/2012 | Huang | B32B 27/308 428/326 |
| 2013/0172795 A1 | 7/2013 | Parssinen | |
| 2013/0253112 A1 | 9/2013 | Boerzel et al. | |
| 2015/0337094 A1* | 11/2015 | Wong | B32B 27/12 525/437 |
| 2016/0076014 A1 | 3/2016 | Medoff et al. | |
| 2016/0250063 A1 | 9/2016 | Pärssinen | |

FOREIGN PATENT DOCUMENTS

| | | |
|---|---|---|
| CN | 101712804 A | 5/2010 |
| CN | 102174270 A | 9/2011 |
| CN | 104497471 A | 4/2015 |
| EP | 0319589 A1 | 6/1989 |
| JP | 2001260108 A | 9/2001 |
| JP | 2002113822 A | 4/2002 |
| JP | 2003342460 A | 12/2003 |
| JP | 2004339454 A | 12/2004 |
| JP | 2006082353 A | 3/2006 |
| JP | 2017002291 A | 1/2017 |

(Continued)

OTHER PUBLICATIONS

ASTM D 5488-94d "Standard Terminology of Environmental Labeling of Packaging Material and Packages".
European Norm EN 13432:2000 Requirements for packaging recoverable through composting and biodegradation—Test scheme and evaluation criteria for the final acceptance of packaging.
Hietala et al: Processing of wood chip-plastic composites: effect on wood particle size, microstructure and mechanical properties. Plastics, Rubber & Composites: Macromolecular Engineering, Mar. 1, 2011, vol. 40, No. 2, pp. 49-56.

(Continued)

Primary Examiner — Doris L Lee
(74) Attorney, Agent, or Firm — Laine IP Oy; Mark W. Scott

(57) ABSTRACT

Composition of a composite material for containers, method of the preparation thereof and its use. The composition comprises a continuous matrix of a thermoplastic polymer having a melting point higher than 110° C. and, distributed within the matrix, non-fibrillated wood particles having a sieved size greater than 1.0 mm. The weight ratio of thermoplastic polymer to wood particles being 45:55 to 80:20. Material further contains 0.1 to 10% by weight, calculated from the total weight of the thermoplastic polymer and the wood particles, of a slate-like mineral pigment. The material is particularly suitable for containers of cosmetic products, for foodstuff and for beverages.

20 Claims, No Drawings

(56) References Cited

FOREIGN PATENT DOCUMENTS

| WO | WO2010103186 A2 | 9/2010 |
| WO | WO2015048589 A1 | 4/2015 |
| WO | WO2017072220 A1 | 5/2017 |

OTHER PUBLICATIONS

Hietala et al: The effect of pre-softened wood chips on wood fibre aspect ratio and mechanical properties of woodpolymer composites. Composites Part A: Applied Science and Manufacturing. Sep. 17, 2011, vol. 42, No. 12, pp. 2110-2116.

Vroman et al: Biodegradable Polymers. Materials, 2009, vol. 2, pp. 307-344.

Balasuriya et al: Mechanical properties of wood flakepolyethylene composites. Part 1: effects of processing methods and matrix melt flow behaviour. Composites Part A: Applied Science and Manufacturing, May 25, 2017, vol. 32, No. 5, pp. 619-629.

Bledzki et al.: Wood Fibre Reinforced Polypropylene Composites: Effect of Fibre Geometry and Coupling Agent on Physico-Mechanical Properties Composite Materials, Nov. 1, 2003, pp. 365-379.

Joffre: Structure and Mechanical Behaviour of Wood-Fibre Composites Uppsala: Acta Universitatis Upsaliensis, Jan. 1, 2014.

\* cited by examiner

MATERIALS FOR PACKAGING

TECHNICAL FIELD

The present invention relates to composite materials suitable for melt processing. In particular, the present invention concerns compositions comprising a continuous matrix of a thermoplastic polymer and wood particles distributed within the matrix. The present invention also concerns a method of producing composite materials as well as uses of such materials for producing articles, such as packaging, by melt processing.

BACKGROUND ART

Composite materials formed by polymers and various wood-based materials are known in the art.

U.S. Pat. No. 8,722,773 teaches composite polymeric materials which include 65 to 90 weight % chemical wood pulp fiber from a chemical wood pulp sheet uniformly dispersed within a polymeric matrix formed by a thermoplastic polymer. The polymer and the chemical wood pulp were combined by melt processing. U.S. Pat. No. 8,722,773 discloses using kraft bleached chemical wood pulp to avoid colour and odor associated with natural fibers like kenaf or whole wood fibers due to the lignin and other compounds contained in such materials.

However, as starting materials for the production of composites, natural fibers and natural products are more inexpensive and thus more attractive than the refined, bleached fibers of the kind disclosed in U.S. Pat. No. 8,722,773.

Composite materials incorporating wood particles are disclosed in JP Published Patent Application No. 2002113822. The publication notes that the coarser the filler, the less even is the surface and the less attractive is the appearance of the product. To address such problems the publication suggests a layered structure, having a base layer with a thickness of 1 to 30 mm and containing less than 50 wt-% wood particles with a diameter of 1 to 10 mm, and a surface layer, which covers the base layer and contains wood particles having a diameter of 50 to 300 µm. The thickness of the surface layer is selected such that it is sufficient to conceal the base layer. No specific use for the material is suggested.

The two-layered structure of JP 2002113822 requires the use of at least two different sources of wood particles, two different polymer blends as well as a manufacturing process based on co-extrusion.

The above publications disclose polymeric materials based on processing of fossil based raw-materials, such as polyolefins, polystyrene, polyacrylates, polyesters, polyamides, poly(ether imides) and acrylonitrile butadiene styrene-type copolymers.

Compositions of a compostable polymer, polylactide, and a micro ground cellulosic material are disclosed in WO 2015/048589, which teaches an annealed poly(lactic acid) composite which contains poly(lactic acid) and up to 30% micro ground cellulosic, such as micro ground paper or paper pulp. The particle size of the micro ground being 10 to 250 µm, in particular 20 to 50 µm with a narrow size distribution. According to the publication, the material is compostable and exhibits a high heat deflection temperature. However, it appears that no mechanical benefits are gained with the microground material, and the maximum loading of the material was, in the reference, limited to 30% to avoid processing and molding difficulties.

Further composite materials are disclosed in CN 101712804 A, US 2013253112, US 2016076014, US 2002130439 and EP 0 319 589.

SUMMARY OF INVENTION

It is an aim of the present invention to eliminate at least a part of the problems relating to the state of the art. In particular, it is an aim of the present invention to provide novel composite materials which contain polymers and significant amounts of wood components.

In one aspect the present invention provides a novel composition of composite materials which are readily melt-processible to provide containers and other articles produced by polymer processing techniques.

In another aspect, the present invention provides methods of producing composite material of the above kind.

In a still further aspect, the present invention provides polymeric articles suitable as containers as well as methods of producing such articles.

The present invention is based on the finding that a composite material having properties of melt-processibility is reached by combining a thermoplastic polymer and non-fibrillated wood particles in such a way that the thermoplastic polymer forms a continuous matrix and the non-fibrillated wood particles are distributed, preferably evenly, within the matrix. Non-fibrillated wood particles suitable for the present purpose have a sieved size greater than 1.0 mm and at least a part of the wood particles is present in the form of wood chips.

Further, in combination with the wood particles, a thermoplastic polymer is selected having a melting point of greater than 110° C.

The weight ratio of the thermoplastic polymer to the wood particles is generally in the range of 20:80 to 90:10, in particular 35:65 to 80:20. Optionally, melt flow properties of the molten polymer can be improved by the incorporation of flow-improvement agents, such as talc, silica or the like.

The starting materials are combined by melt-mixing them at a predetermined ratio to form a melt which is cooled, optionally after being shaped into a predetermined shape or form to provide an article for example in a mold.

The cooled melt or shaped article can be further treated by applying a barrier coating on at least one surface thereof.

The present materials can be used, for example in containers, such as jars, squeeze tubes and bottles for cosmetics, foodstuff and beverages.

More specifically, the invention is characterized by what is stated in the characterizing part of the independent claims.

Considerable advantages are obtained with the invention. Thus, the present polymer compositions are melt-processible. The wood chips, i.e. the flat-shaped wood particles, in the composition are well dispersed throughout the polymer matrix. It has been found that during processing of mixtures formed by the polymer and the flat wood particles at temperatures above the melting point of the polymer, the wood particles run smoothly through the equipment, for example nozzle parts, and do not impair the melt flow rate of the polymer material. On the contrary, it would appear that the present compositions are more easily processed by, for example, injection molding than neat polymers. By contrast, cubically shaped wood particles, when mixed with the polymer matrix at the same ratios, give lower melt flow rates and cause clogging for nozzles and thus uneven feed of melt into molds.

The present invention allows for the use of wood particles having a prevalent particle size of more than 1 mm and up to 3 mm or even more. In one embodiment, the prevalent particle size falls in the range from 1.40 to 2.49 mm.

In the present context, the term "prevalent" stands for 80% or more of the weight of the particle matter being formed by particles having a greatest dimension falling within the indicated range.

The use of large wood particles in polymer compositions cuts costs of the material. Further, by using large wood particles problems conventionally caused by increased hygroscopicity and loss of weatherability due to an incorporation of wood particles can be reduced or even partially eliminated.

By using, in preferred embodiments, compostable polymers for the polymer matrix, the present invention provides for polymer-wood-composite articles which are truly compostable.

The surfaces which come into contact with aqueous compositions can be treated with sol-gel coatings and similar barrier coatings in order to further improve the barrier properties of the shaped articles. This will allow for the use of containers made from the present composites also for storing aqueous compositions and compositions containing oily and fatty components.

DESCRIPTION OF EMBODIMENTS

In an embodiment of the present technology, a composition comprises a matrix of a thermoplastic polymer having a melting point greater than 110° C. and, distributed in the thermoplastic polymer matrix, non-fibrillated wood particles of a sieved size greater than 1.0 mm. At least a part of the wood particles is present in the form of flat-shaped wood chips.

The weight ratio of thermoplastic polymer to wood particles is typically 35:65 to 80:20. In one embodiment, the weight ratio of thermoplastic polymer to wood particles is 30:70 to 90:10. In a preferred embodiment, the composite comprises 30 to 70%, in particular 40 to 60% by weight of wood particles calculated from the total weight of the thermoplastic polymer and the wood particles.

In an embodiment, the wood particles employed comprise or consists of or consists essentially of particles having a sieved size of greater than 1.0 mm and less than 5 mm.

Thus, in one embodiment, at least 70%, preferably at least 80%, typically 80 to 95%, by weight of the wood particles have a sieved size in the range of 1 to 2 mm.

In a second embodiment, at least 70%, preferably at least 80%, typically 80 to 95%, by weight of the wood particles have a sieved size in the range of 1.4 to 2.5 mm.

The term "sieved size" refers to the size of the wood particles before mixing with the thermoplastic polymer to form melt-processed polymer-wood-composition. During melt processing at least some diminution for example by crushing of the wood particles typically takes place.

The wood particles of the composition are at least partially formed by particles having a non-cubical shape. Such particles can be characterized as being "platy" or "slate-like" of "flat" or "flat-shaped". In an embodiment of the invention, the wood particles of the compositions are particles obtained by chipping of wood raw-material. In the present context, wood particles are considered to be flat-shaped wood chips when they have a generally planar structure with a cross-sectional thickness of the planes that is typically less than 40%, in particular less than 25%, for example less than 10%, of the largest dimension of the planar surface of the particles.

In one embodiment, at least 50% by weight of the wood particles are platy before melt-processing.

Naturally, by chipping of wood, a finely divided particulate matter is obtained which contains wood chips or wood shavings along with particles having a variety of other shapes. The present compositions can therefore also include saw dust and wood flour.

However, in a preferred embodiment, the wood chips which have a sieved size of greater than 1.0 mm, for example greater than 1.5 mm, form at least 50%, preferably at least 70%, in particular at least 80%, for example at least 90% or even at least 95%, of the total weight of wood particles in the composite.

As discussed above, the wood chips contained in embodiments of the present technology will contribute to good dispersion of the wood material within the polymer and to good processibility of the materials in polymer processing equipment. Thus, as a result relatively large wood particles, for example, with prevalent (80%) particle size between 1.40 and 2.49 mm, can be used. Further, it has been found that wood chips run smoothly through the nozzle parts of melt-processing equipment, such as injection molding devices, and do not hinder melt flow rate of the composite.

The present wood particles are typically "non-fibrillated" which signifies that they are obtained by a mechanical processing, such as chipping or shaving. This mechanical processing is different from one in which fibres are liberated from wood material by fibrillation, in particular fibrillation carried out by refining or grinding of chips or logs, or by pulping of wood raw-material by chemical means, such as pulping in a chemical pulping liquor. Such processing produces "fibers" or "fibrils".

Nevertheless, it is possible to incorporate a portion of fibres or fibrils, in particular fibres or fibrils derived from a lignocellulosic material, e.g. a wood material, into the present compositions in addition to the non-fibrillated wood particles. Typically, such fibrillated components form less than 50% of the total weight of the non-polymer part of the compositions. In particular, the fibrillated components form less than 40% by weight, for example less than 30% by weight, suitably less than 20% by weight, for example less than 10% or even less than 5%, by weight of the total weight of the non-polymer part of the compositions.

Suitable fibres can be obtained from lignocellulosic materials, such as annual or perennial plants or wood materials, including grass, hay, straw, bamboo, kenaf, hemp, jute, plant residues remaining following the harvest of crops, such as rice, soybeans, grass seeds as well as crushed seed hulls of cereal grains, in particular of oat, wheat, rye and barley, and coconut shells.

In an embodiment, the composition further contains mineral fillers. In a preferred embodiment, the mineral fillers are formed by slate-like particles, such as talc or kaolin. Other fillers and admixtures are represented by silica and waxes. Typically, the content of mineral fillers, if any, amounts to about 0.1 to 40%, in particular about 0.5 to 30%, calculated from the total weight of the thermoplastic polymer and the wood particles.

Slate-like mineral pigments may impart improved barrier properties to the composition. The slate-like mineral pigments may also perform as processing-aids during melt-processing of the compositions. Silica, i.e. finely divided silicon dioxide materials will improve melt-flow properties.

Other mineral fillers and pigments may also be present in the compositions. Typically, the total content of mineral fillers, including the slate-like mineral pigments, is less than 50% of the non-polymer part of the compositions.

Examples of mineral fillers and pigments include calcium carbonate, calcium sulphate, barium sulphate, zinc sulphate, zinc stearate, calcium stearate, titanium dioxide, aluminium oxides, and aluminosilicates.

In an embodiment, the composite further contains particles of a finely divided material capable of conferring properties of color to the composite. The dying material can for example be selected from natural materials having colors which are stable at the processing temperatures employed during melt processing. In one embodiment, the dying materials are stable at temperatures of up to 200° C.

Additional components, such as any of the above mentioned, and including processing aids, can be incorporated into the composite by using the thermoplastic materials in the form of masterbatches.

Thus, modified PLA masterbatches can be used as processing-aids, e.g. Sukano PLA s 533.

The wood particles can be derived from softwood or hardwood including pine, spruce, larchwood, juniper, birch, alder, aspen, poplar, eucalyptus and mixed tropical hardwood. In a preferred embodiment, the wood material is selected from hardwood, in particular from hardwood of the Populus species, such as poplar or aspen. By using non-coniferous wood materials, gaseous emissions of terpenes and other volatile components, typical for coniferous wood species, can be avoided during melt-processing.

It is preferred that the wood particles are uniformly distributed throughout the thermoplastic polymer matrix. In one embodiment, this means that the content of wood particles in any volume of 1 cm$^3$ of the material differs from the average content of other volumes of the material having the same 1 cm$^3$ volume less than 50%. In a preferred embodiment, a composite formed from a translucent polymer and shaped into a plate having a thickness of 2.5 mm is non-translucent due to the presence of wood particles therein, in particular, when the content of the wood particles is more than 30%, in particular 40% or more, of the total weight of the wood particles and the thermoplastic polymer.

The matrix of the composite material is formed by a thermoplastic polymer.

In an embodiment, the thermoplastic polymer has melting point greater than about 150° C., in particular greater than about 155° C. The thermoplastic polymer is particularly selected from the group of biodegradable polymers, such as polyesters, including polylactide and poly(lactic acid), polyglycolide and poly(glycolic acid), cellulose acetate propionate, or polyhydroxyalkanoate, e.g. polyhydroxybutyrate. The thermoplastic polymer can also be poly(butylene succinate) (PBS) and its copolymers.

In some embodiments non-biodegradable polymers, such as polyolefins, polyesters, in particular biodegradable polyesters, polyamides, polyimides are employed as well for achieving composite materials filled with wood particles as herein described.

In the present context, the term biodegradable polymer stands for polymers which are biodegradable in the sense that they are capable of undergoing decomposition into compounds selected from carbon dioxide, methane, water, inorganic compounds and biomass, as provided for in, for example, ASTM standard D-5488-94d and in European norm EN 13432. A review on Biodegradable Polymers is presented in Isabelle Vroman and Lan Tighzert, "Biodegradable Polymers", *Materials* 2009, 2, 307-344; doi:10.3390/ma2020307.

The contents of the above standard, norm and review article are herewith incorporated by reference.

The molecular weight of the biodegradable polymer should be sufficiently high to enable entanglement between polymer molecules and yet low enough to be melt processed.

In one embodiment, polylactic acid or polylactide (which both are referred to by the abbreviation "PLA") is employed. One particularly preferred embodiment comprises using PLA polymers or copolymers which have weight average molecular weights of from about 10,000 g/mol to about 600,000 g/mol, preferably below about 500,000 g/mol or about 400,000 g/mol, more preferably from about 50,000 g/mol to about 300,000 g/mol or about 30,000 g/mol to about 400,000 g/mol, and most preferably from about 100,000 g/mol to about 250,000 g/mol, or from about 50,000 g/mol to about 200,000 g/mol.

When using PLA, it is preferred that the PLA is in the semi-crystalline or partially crystalline form. To form semi-crystalline PLA, it is preferred that at least about 90 mole percent of the repeating units in the polylactide be one of either L- or D-lactide, and even more preferred at least about 95 mole percent.

In another embodiment, the thermoplastic polymer has a melting point in the range of about 110 to 150° C., or 110 to 120° C. Such a thermoplastic can be selected from polybutyrate (also abbreviated PBAT).

This kind of thermoplastic polymer can comprise a neat polymer either in the form of a homopolymer or a copolymer, for example a random copolymer, such as a copolyester of adipic acid, 1,4-butanediol and dimethyl terephthalate.

PBAT polymers are typically biodegradable, statistical, aliphatic-aromatic copolyesters. Suitable materials are supplied by BASF under the tradename Ecoflex®. The polymer properties of the PBAT are similar to PE-LD because of its high molecular weight and its long chain branched molecular structure.

PBAT is classified as a random copolymer due to its random structure. This also means that it cannot crystallize to any significant degree due to the wide absence of any kind of structural order. This leads to several physical properties: wide melting point, low modulus and stiffness, but high flexibility and toughness.

In addition to virgin polymers, the composition may also contain recycled polymer materials, in particular recycled biodegradable polymers. Furthermore, the composition may also contain composites of polyesters, such as fiber reinforced PLA, ceramic materials and glass materials (e.g. bioglass, phosphate glass).

In an embodiment, the method of producing a composite material comprises the steps of
providing a thermoplastic polymer having a melting point greater than 110° C.,
providing non-fibrillated wood particles having a sieved size of greater than 1.0 mm, in particular greater than 1.5 mm, at least a part, preferably 50 wt-% or more of the wood particles being in the form of flat-shaped wood chips,
melt-mixing the thermoplastic polymer with the wood particles at a mixing ratio of 30:70 to 90:10, for example 35:65 to 80:20, by weight, to form a composite material melt; and
cooling the melt.

The sieved particle sizes discussed above are applicable to the method as well. Thus, in one embodiment, the wood particles employed comprise or consists of or consists essentially of particles having a sieved size of greater than 1.0 mm and less than 5 mm.

In one embodiment, at least 70%, preferably at least 80%, typically 80 to 95%, by weight of the wood particles have a sieved size in the range of 1 to 2 mm.

In a second embodiment, at least 70%, preferably at least 80%, typically 80 to 95%, by weight of the wood particles have a sieved size in the range of 1.4 to 2.5 mm.

One embodiment provides for a composite material comprising a continuous matrix of a thermoplastic polymer having a melting point greater than 150° C., said thermoplastic polymer being selected from the group of biodegradable polymers formed by polylactide, cellulose acetate propionate and polyhydroxybutyrate, and PBS (polybutylenesuccinate), and distributed within the matrix, non-fibrillated wood particles having a sieved size greater than 1.0 mm and at least at least 70% by weight of the wood particles have a sieved size in the range of 1 to 3 mm, at least a part of the wood particles being in the form of flat-shaped wood chips, the composite comprising 20 to 60% by weight of wood particles calculated from the total weight of the thermoplastic polymer and the wood particles.

It is preferred to carry out the cooling step in a mold in which the melt is shaped into an article having a predetermined shape.

Typically, the thermoplastic polymer is fed in the form of finely-divided particles or pellets together with the non-fibrillated wood particles in the form of a dry mixture, into the feed zone of a melt-processing polymer processing device. The thermoplastic polymer is fed in the form of a neat polymer, as a homo- or copolymer.

A further embodiment comprises the step of providing a slate-like mineral pigment, and melt-mixing the mineral pigment with the wood particles and the thermoplastic polymer, the amount of the mineral pigment being 0.1 to 40% by weight, calculated from the total weight of the thermoplastic polymer and the wood particles, The blend or mixture comprising thermoplastic polymer, the wood particles and any slate-like mineral pigment is processed by injection moulding into a predetermined article.

In an embodiment, the components are physically mixed and fed to the hopper of an injection molding machine having a screw mixing zone. To reduce or prevent degradation of the polymer, the components are subjected to melt mixing in the screw for a limited space of time amounting typically to less than about 10 minutes. The processing temperature is kept below the decomposition temperature of the polymer. In case of PLA, a maximum temperature of 200° C. is preferred. To reduce or prevent degradation of the polymer during processing, in a preferred embodiment a screw with an L/D ratio of at least 20:1 is used.

For shaping the melt into an article of predetermined form a mold is used. The mold temperature is generally lower than the glass transition temperature of the polymer. For PLA, a temperature of about 25-60° C. is preferred, and for amorphous PLA, the preferred range is about 35-55° C.

The pressure employed during injection molding is typically in the range of 50 to 150 bar, for example about 80 to 120 bar, with a back pressure in the range of 1 to 10 bar, for example 1 to 3 bar.

In addition to conventional injection moulding for forming three-dimensional objects for example of rigid-walled containers and other vessels, the compositions can be processed by injection blow molding or injection stretch blow molding to produce containers having elastic or flexible walls.

Typically, the rigid-walled containers and other vessels have a wall thickness in the range of 1 to 10 mm.

In preferred embodiments, squeeze tubes are made by injection-molding the head portion of the tube that defines the nozzle or orifice from which the contents will be dispensed, then separately extruding the tubular body portion of the tube, and finally joining the head and body portions together by a suitable method such as heat sealing or ultrasound welding. For economic reasons, it is also possible to injection-mold the entire tube as a one-piece integral part.

During melt-processing it is generally preferred to maintain the temperature below the decomposition temperature of the polymer material and of the wood components. Thus, in preferred embodiments, the material is processed at a temperature below 205° C.

In one embodiment, the melt-processing can be carried out at a temperature in the range from the melting point of the thermoplastic polymer up to about 200° C.

The thermal properties of the compositions can be modified and improved by the addition of mineral components. Thus, using slate-like mineral pigments, such as talc or clay, not only improved barrier properties are obtained but also improved heat resistance which allows for mixing and processing of the wood particles and the polymer without pyrolysis of the wood particles even at temperatures in excess of 180° C.

The present composites exhibit in combination properties of gas, liquid and oil barrier. Although the properties of the material as such are good, it is possible further to improve the barrier properties of the shape products by applying a barrier coating onto the surface of the melt. In particular a coating is applied onto the surface of the cooled melt, or onto a surface of an article shaped from the composite material.

In one embodiment, the coating is a sol-gel composition, which preferably is applied by spray-coating on the surface of the melt or an article shaped from the melt.

The present materials are suitable for producing, for example by injection moulding, a container, such as a rigid-walled or semi-rigid walled container for cosmetic products or foodstuff, a bottle for cosmetic products, foodstuff or beverages, or a squeeze tube for cosmetic products, foodstuff and beverages, which can be still or carbonated. The content can be cold or warm, typically the content can have a temperature of 0 to 100° C., for example 1 to 80° C., although the present container can also be used at subzero conditions. In an embodiments, the container can be used at −45° C. . . . −0° C., in particular at 25° C. . . . −0° C.

In one particularly interesting embodiment, bottles are produced from the present materials by injection stretch blow molding (ISBM). Typically ISBM can be a single-step or a two-step process. Alternatively bottles can be produced by extrusion blow molding for example using standard extruder barrel and screw assemblies conventionally applied for plastification of polymers and shaping thereof.

In a preferred embodiment, the processing is carried out as a two-step process which allows for better process control and more flexibility with machine efficiencies and capability. In the first step, the preforms are made using an injection molding machine. These preforms are later blown in a separate stretch blow machine. The wall thickness of the preform is important for the success of the second step. If the preform wall is too thick, it requires excess heating which can cause the material to crystallize. In contrast, too thin preform wall is prone to tearing.

In the second step, the preform is conveyed on a rotating spindle and passed through an infra-red bank oven, where it is heated to 85-95° C., the optimum temperature for blow molding in a 2-step process. The heated up preform is transferred to the blow mold and the blow nozzle moves down to make a seal on the preform neck. A stretch rod then moves inside the preform towards the tip of the preform at a speed of 1.2-2 m/s and stretches the preform towards the base in the blow mold. Compressed air at relatively low air pressure of about 0.2-0.5 MPa is simultaneously blown into the preform to partially inflate the preform, so that it does not touch the stretch rod. Once the stretch rod has traveled to the base cup, the air pressure is increased to 3.8-4.0 MPa to form the preform into the desired shape with good definition. The reheating step followed by stretch blow molding of the preform is highly dependent on the grade of PLA resin utilized.

The articles thus produced, for examples containers, can be coated for improving barrier properties.

In one embodiment, coating is applied to the inner surface of the container to achieve suitable barrier properties for the storage of fluids or emulsions.

In one preferred embodiment, the coating comprises an aqueous sol-gel composition that is applied by spray-coating device to the inner surface of the container. In another embodiment, the coating comprises a hybrid composite containing polymeric component and inorganic component. Such coatings can be hardened either at room temperature or may require hardening by UV light or heat.

A coating can also be applied to the outside of the container to achieve scratch-resistance, high gloss or other enhancement of the surface properties.

With regard to coating of containers, reference is made to US 2007/0148384 which discloses methods for filming biodegradable or compostable containers, and as well as the containers formed by such methods. The content of US 2007/0148384 is herewith incorporated by reference.

The following non-limiting examples illustrate embodiments of the present technology.

EXAMPLES

Example 1

A first set of materials was manufactured from polylactic acid (PLA) and wood chips by injection molding. PLA pellets and wood chips were dried for before injection molding to remove any moisture during the processing. PLA pellets and aspen wood chips [prevalent particle size in the range from 1.00 to 1.99 mm ("wood 1") or prevalent particle size in the range from 1.40 to 2.49 mm ("wood 2")] were weighed at a weight ratio of 60 parts by weight of polymer and 40 parts by weight of wood chips. Coniferous wood dust was used as a reference (Wood 3).

In a second set of materials a mixture with talc was prepared, with 20 w-% talc, 40 w-% wood chips and 40 wt-% PLA. Micro sized talc was supplied by Specialty Minerals with the trade name of ULTRATALC®609. This talc had a median particle size less than 0.9 microns, specific gravity 2.8, bulk density 0.10 grams/cc, tapped density 0.32 g/cc, and pH 8.8.

The components, PLA pellets, wood chips and optionally talc, were physically mixed in a vessel and fed to the hopper of an Engel injection molding machine for producing a composite article in the shape of ajar. The ingredients are allowed to melt mix in the screw. The processing temperature was below 200° C. Mold temperature was 35° C. After a cooling time (40 s) the product was removed from the mold.

A coating was applied on the inner surface of the jar to achieve barrier properties suitable for allowing storage of fluids or emulsions in the jar. The coating was an aqueous sol-gel composition (Avalon, supplied by Millidyne Oy), applied by spray-coating device to the inner surface of the jar.

The mechanical properties of composites manufactured by injection molding were analyzed by tensile testing (ISO 527) and impact testing (Charpy impact, notched, ISO 179). Typical values measured for various wood-polymer composites made by injection molding process according to this invention are shown in Table 1.

TABLE 1

Mechanical properties of the wood-polymer composites and polymer controls

| | Sample | Young's Modulus (MPa) | Tensile strength (MPa) | Elongation at break (%) | Charpy, impact (notched, 23° C.) |
|---|---|---|---|---|---|
| 1. | PLA control | 3122 | 61.3 | 2.9 | 22.8 |
| 2. | PLA + 20% wood 1 | 5197 | 47.8 | 1.46 | 8.1 |
| 3. | PLA + 40% wood 1 | 6880 | 40.8 | 0.99 | 6.2 |
| 4. | PLA + 40% wood 1 + talc 20% | 7316 | 34.8 | 0.69 | 5.1 |
| 5. | PLA + 40% wood 2 | 4948 | 34.5 | 1.04 | N.D. |
| 6. | PLA + 40% wood 3 | 5083 | 34.6 | 0.86 | N.D. |
| 7. | PLA 2 + 40% wood 1 | 8151 | 41 | 0.96 | N.D. |
| 8. | PBAT + 40% wood 1 | 661 | 12.6 | 13.51 | 32.9 |

N.D. = Not determined

The samples for barrier testing were prepared by injection molding as described above. The samples were sheets of 100 mm×100 mm×3 mm in size.

The barrier properties on oxygen, water vapour and oil permeability of the composite and controls manufactured by injection molding were analyzed.

Oxygen transmission rate (OTR) was measured using standard procedure based on ASTM D3985 (at 23° C., 0% relative humidity).

Water vapor transmission rate (WVTR) was measured gravimetrically using standard procedure based on ASTME-96 (at 38° C., 90% relative humidity).

Oil penetration was measured by modified Tappi T 507 method with cooking oil (0-2 days at 40° C., 3-6 days at 60° C., 7-8 days at 80° C.). Typical values measured for wood-polymer composition and controls prepared according to the injection molding process described in this invention are shown in Table 2.

TABLE 2

Barrier properties of the wood-polymer composite and polymer controls.

| | Sample | OTR [$cm^3/m^2$/day] | WVTR [g/$m^2$/day) | Oil penetration |
|---|---|---|---|---|
| 1 | PLA control | <0.1 | 2.6 | 0 |
| 2 | PLA + 40% wood 1 | <0.1 | 4.1 | 0 |
| 3 | PP | 19 | 0.5 | 0 |
| 4 | HD-PE | 12 | 0.7 | 0 |

Example 2

Compositions for injection-molding of long, thin-walled, one-piece squeeze tubes include polybutylene adipate terephthalate (PBAT), having a density greater than about 1.24 g/cc), and non-fibrillated wood chips (as described above) having a sieved size greater than 1.0 mm, and the weight ratio of polymer to wood particles being 50:50 to 95:5.

The compositions also include a polymer that is miscible and compatible with PBAT, and wood chips for enhancing flow of the molding composition in the mold, being a biodegradable polyester with low melting temperature, such as polycaprolactone (PCL).

A particularly preferred molecular weight range for PCL is from 35,000 to 50,000 g/mol. This blend preferably comprises approximately 65% by weight PBAT; 5% by weight PCL; 30% by weight wood chips. The blend can also contain 0.1-1.0% of injection molding additives (e.g. mineral component such as silica or talc). The composition for injection-molded squeeze tubes comprises a blend of multiple components selected such that the resulting composition has a high melt index for enhancing flow of the composition in the mold, having suitable flexibility without compromising strength and tear resistance. Addition of wood to the composition, even at low level e.g. 10%, helps the removal of the molded part from mold.

The tube form is made using a standard injection molding machine. The mold contains forms for the tubular body portion of the tube that is open at one end, and for the head portion joined to the opposite end of the body portion. The head portion has a nozzle from which contents can be dispensed and external threads for a screw cap, or other features for other types of closures.

The mold is clamped and the extruder nozzle moves forward to inject the polymer-wood melt into the mold cavity. Preferably, for the PBAT-wood composite, the temperature profile of the injection molding barrel from the hopper towards the die should be 160, 165, 165, 165, 170° C. The mold temperature should be set to 55° C. The injected preform is cooled to ambient temperature. The tube would be filled through the open end, and then the open end would be sealed by heat-sealing or ultrasound device. Heat and ultrasound sealing were tested for the composite and was successful for attaching composite sheets containing 10-40% wood chips to each other firmly.

INDUSTRIAL APPLICABILITY

The materials according to present invention, as well as the above discussed embodiments, find a great number of applications, for example as containers, such as jars, squeeze tubes and bottles for cosmetics, foodstuff, both cold and warm, and beverages, still and carbonated and optionally to be stored under pressure. Other applications include drinking cups for hot and cold drinks, plates and bowls, disposable cutlery, food trays etc. The materials are compostable or biodegradable.

CITATION LIST

Patent Literature
U.S. Pat. No. 8,722,773
JP 2002113822
WO 2015/048589
CN 101712804
US 2013/253112
US 2016/076014
US 2002/130439
US 2007/0148384
EP 319 589
Non-Patent Literature
ASTM standard D-5488-94d
European norm EN 13432
Isabelle Vroman and Lan Tighzert, "Biodegradable Polymers", *Materials* 2009, 2, 307-344; doi:10.3390/ma2020307.

The invention claimed is:

1. A composite material composition comprising:
   a matrix comprising a thermoplastic polymer having a melting point greater than 110° C., and
   non-fibrillated wood particles distributed within the matrix having a sieved size of at least 1.0 mm, at least a portion of the wood particles being in the form of flat-shaped wood chips, and at least 70% by weight of the wood particles having a sieved size in the range of 1.0 to 2.5 mm,
   wherein a weight ratio of thermoplastic polymer to wood particles is from 35:65 to 80:20.

2. The composition according to claim 1, wherein said composition further comprises 0.1 to 20% by weight of a slate-like mineral pigment, calculated from a total weight of the thermoplastic polymer and the wood particles, of a slate-like mineral pigment.

3. The composition according to claim 1, wherein the wood particles comprise particles having a sieved size of greater than 1.0 mm and less than 5 mm.

4. The composition according to claim 1, wherein at least 50% by weight of the wood particles are in the form of flat-shaped wood chips.

5. The composition according to claim 1, wherein the composite material composition comprises 40 to 60% by weight of wood particles calculated from a total weight of the thermoplastic polymer and the wood particles.

6. The composite material composition of claim 1, wherein the composite material composition comprises a rigid-walled container having a wall thickness of 1 to 10 mm.

7. The composition according to claim 1, wherein the thermoplastic polymer comprises a biodegradable thermoplastic polymer.

8. The composition according to claim 7, wherein the biodegradable thermoplastic polymer comprises has a melting point in the range of about 110 to 150° C., and wherein said thermoplastic polymer comprises polyhydroxybutyrate or polybutyrate.

9. The composition according claim 7, wherein the biodegradable thermoplastic polymer comprises a member selected from the group consisting of polyactide, poly(lactic acid), polyglycolide, poly(glycolic acid), cellulose acetate propionate, a polyhydroxyalkanoate, polyhydroxybutyrate, polybutyrate, poly(butylene succinate), a copolyester of adipic acid, 1,4-butanediol, and dimethyl terephthalate, and copolymers thereof.

10. A method of producing a composite material composition comprising:
    providing a matrix comprising a thermoplastic polymer having a melting point greater than 110° C.;
    providing non-fibrillated wood particles distributed within the matrix having a sieved size of at least 1.0 mm, at least a portion of the wood particles being in the form of flat-shaped wood chips, and at least 70% by weight of the wood particles having a sieved size in the range of 1.0 to 2.5 mm;

melt-mixing the thermoplastic polymer with the wood particles at a mixing ratio of 35:65 to 80:20 by weight to form a composite material melt; and cooling the melt to form the composite material composition.

11. The method according to claim 10, wherein the composite material melt is cooled in a mould to form an article having a predetermined shape.

12. The method according to claim 10, wherein the thermoplastic polymer is fed in the form of particles or pellets together with the non-fibrillated wood particles as a dry mixture into a feed zone of a melt-processing polymer processing device.

13. The method according to claim 10, wherein the slate-like mineral pigment is melt-mixed with the wood particles and the thermoplastic polymer without pyrolysis of the wood particles.

14. The method according to claim 10, wherein the thermoplastic polymer comprises a biodegradable thermoplastic polymer.

15. The method according to claim 10, wherein the biodegradable thermoplastic polymer comprises a a member selected from the group consisting of polyactide, poly(lactic acid), polyglycolide, poly(glycolic acid), cellulose acetate propionate, a polyhydroxyalkanoate, polyhydroxybutyrate, polybutyrate, poly(butylene succinate), a copolyester of adipic acid, 1,4-butanediol, and dimethyl terephthalate, and copolymers thereof.

16. The method according to claim 10, further comprising applying a coating conferring barrier properties onto a surface of the composite material melt or to an article shaped from the composite material melt.

17. The method according to claim 10, comprising:
providing a slate-like mineral pigment, and
melt-mixing the mineral pigment with the wood particles and the thermoplastic polymer, an amount of the mineral pigment being 0.1 to 20% by weight, calculated from a total weight of the thermoplastic polymer and the wood particles.

18. The method according to claim 17, further comprising injection moulding the composite material melt comprising thermoplastic polymer, the wood particles, and the slate-like mineral pigment.

19. The method according to claim 17, wherein the thermoplastic polymer, the wood particles, and the slate-like mineral pigment are melt-mixed at a temperature a temperature in a range from a melting point of the thermoplastic polymer up to 200° C.

20. A composite material composition comprising:
a matrix comprising a thermoplastic polymer having a melting point greater than 110° C., and
non-fibrillated wood particles distributed within the matrix having a sieved size of at least 1.0 mm, at least a portion of the wood particles being in the form of flat-shaped wood chips, and at least 70% by weight of the wood particles having a sieved size in the range of 1.0 to 2.5 mm,
wherein a weight ratio of thermoplastic polymer to wood particles is from 35:65 to 80:20, wherein the composite material composition comprises 40 to 60% by weight of wood particles calculated from a total weight of the thermoplastic polymer and the wood particles.

* * * * *